United States Patent
He et al.

(10) Patent No.: US 11,952,503 B2
(45) Date of Patent: Apr. 9, 2024

(54) POLYOLEFIN AND POLYVINYLPYRROLIDONE FORMULATION

(71) Applicant: Dow Global Technologies LLC, Midland, MI (US)

(72) Inventors: Chao He, Shanghai (CN); Yabin Sun, Shanghai (CN); Jeffrey M. Cogen, Flemington, NJ (US); Timothy J. Person, Pottstown, PA (US); Hongyu Chen, Shanghai (CN)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 744 days.

(21) Appl. No.: 16/968,440

(22) PCT Filed: Mar. 11, 2019

(86) PCT No.: PCT/US2019/021587
§ 371 (c)(1),
(2) Date: Aug. 7, 2020

(87) PCT Pub. No.: WO2019/182787
PCT Pub. Date: Sep. 26, 2019

(65) Prior Publication Data
US 2020/0399499 A1  Dec. 24, 2020

(51) Int. Cl.
*H01B 3/44* (2006.01)
*C08L 23/06* (2006.01)
*C09D 123/06* (2006.01)

(52) U.S. Cl.
CPC ............ *C09D 123/06* (2013.01); *C08L 23/06* (2013.01); *H01B 3/44* (2013.01); *H01B 3/448* (2013.01); *C08L 2201/08* (2013.01); *C08L 2203/202* (2013.01); *C08L 2207/066* (2013.01); *C08L 2312/00* (2013.01)

(58) Field of Classification Search
CPC .......... H01B 3/44; H01B 3/441; H01B 3/448; C08L 23/06; C08L 2201/08; C08L 2203/202; C08L 2207/066
USPC ................. 174/110 R–110 PM, 120 R–122 R
See application file for complete search history.

(56) References Cited

U.S. PATENT DOCUMENTS

| | | | |
|---|---|---|---|
| 4,018,852 A | 4/1977 | Schober | |
| 4,291,094 A * | 9/1981 | Trumble | H01B 13/12 524/297 |
| 4,412,938 A | 11/1983 | Kakizaki et al. | |
| 5,246,783 A | 9/1993 | Spenadel et al. | |
| 5,266,627 A | 11/1993 | Meverden et al. | |
| 5,346,961 A | 9/1994 | Shaw et al. | |
| 5,492,760 A | 2/1996 | Sarma et al. | |
| 5,649,041 A | 7/1997 | Clyburn, III et al. | |
| 6,277,925 B1 | 8/2001 | Biswas et al. | |
| 6,496,629 B2 | 12/2002 | Ma et al. | |
| 6,714,707 B2 | 3/2004 | Rossi et al. | |
| 6,869,995 B2 | 3/2005 | Caronia et al. | |
| 8,217,105 B2 | 7/2012 | Herbst et al. | |
| 8,455,580 B2 | 6/2013 | Sengupta et al. | |
| 9,589,700 B2 | 3/2017 | Sun et al. | |
| 2002/0041744 A1 | 4/2002 | Anelli et al. | |
| 2014/0113133 A1* | 4/2014 | Sun | H01B 3/441 428/375 |
| 2014/0305677 A1 | 10/2014 | Defrancisci et al. | |
| 2016/0340492 A1 | 11/2016 | Sun et al. | |

FOREIGN PATENT DOCUMENTS

| | | | |
|---|---|---|---|
| CN | 1281483 | 1/2001 | |
| CN | 103554611 A | 2/2014 | |
| CN | 103756190 A | 4/2014 | |
| CN | 105086054 A | 11/2015 | |
| CN | 105778300 | 7/2016 | |
| CN | 105778300 A * | 7/2016 | ............ C08L 23/16 |
| CN | 107118441 A | 9/2017 | |
| EP | 0735545 | 6/1999 | |
| EP | 0966003 B1 | 10/2006 | |
| EP | 1731563 | 12/2006 | |
| JP | 62010123 | 1/1987 | |
| JP | 1990056810 | 2/1990 | |
| JP | 3006249 | 1/1991 | |
| JP | 6027151 | 4/1994 | |
| JP | H11228763 A | 8/1999 | |
| JP | 2000306433 A | 11/2000 | |
| JP | 2001312922 A | 11/2001 | |
| JP | 2002302577 A | 10/2002 | |
| JP | 05204780 B2 | 6/2013 | |
| KR | 2012009754 | 2/2012 | |

(Continued)

OTHER PUBLICATIONS

Braun, "Certification of Equivalent Spherical Diameters of Silica Nanoparticles in Water", 2011, Commission, Joint Research Centre, Institute for Reference Materials and Measurements, Geel, Belgium.
Minnema, "An Investigation into the Mechanism of Water Treeing in Polyethylene High-Voltage Cables", 1980, p. 461-472.
Sadeghi, Thermodynamics of Aqueous Solutions Of Polyvinylpyrrolidone J. Chem. Thermodynamics, 2004, p. 665-670, vol. 36.
Office Action from corresponding Korean Application No. 10-2020-7028389 dated Dec. 5, 2023.

*Primary Examiner* — William H. Mayo, III

(57) ABSTRACT

A polyolefin and polyvinylpyrrolidone formulation including (A) an olefin-based (co)polymer, (B) a polyvinylpyrrolidone (co)polymer, and (C) an antioxidant. Also a method of making the composition; a crosslinked polyolefin product made by curing the composition; manufactured articles including a shaped form of the inventive formulation or product; and methods of using the inventive formulation, product, or articles.

13 Claims, No Drawings

(56) References Cited

FOREIGN PATENT DOCUMENTS

| WO | 1999024504 | 5/1999 | | |
|---|---|---|---|---|
| WO | 2006131266 | 12/2006 | | |
| WO | 2016200600 | 12/2016 | | |
| WO | WO 2019/182787 A1 * | 9/2019 | ............... | H01B 3/44 |

* cited by examiner

POLYOLEFIN AND POLYVINYLPYRROLIDONE FORMULATION

FIELD

Formulations of a polyolefin and a polyvinylpyrrolidone, and related aspects.

INTRODUCTION

Insulated electrical conductors typically comprise a conductive core covered by an insulation layer. The conductive core may be solid or stranded (e.g., a bundle of wires). Some insulated electrical conductors may also contain one or more additional elements such as semiconducting layer(s) and/or a protective jacket (e.g., wound wire, tape, or sheath). Examples are coated metal wires and electrical power cables, including those for use in low voltage ("LV", >0 to <5 kilovolts (kV)), medium voltage ("MV", 5 to <69 kV), high voltage ("HV", 69 to 230 kV) and extra-high voltage ("EHV", >230 kV) electricity-transmitting/distributing applications. Evaluations of power cables may use s standards and/or IEC test methods.

Compositions are mentioned in U.S. Pat. Nos. 4,412,938; 4,291,094; 5,649,041; 8,217,105 B2; and CN105778300 A.

SUMMARY

We recognized a problem that hurts the performance of power cables operating at higher voltages and exposed to moisture. Under these conditions, water-tree growth can occur over time in the insulation layer, which can lead to electrical treeing therein, which in turn can ultimately lead to failure of the insulation layer. The time to reach such failure can be lengthened, and thus reliability of power delivery increased and maintenance costs decreased, by using a more resilient material in the insulation layer. Past material solutions that were proposed for MV power cables, however, result in unacceptable dissipation factor if used at higher voltages (HV or EHV power cables).

We found that using more of certain water-tree retardant additives does not necessarily increase inhibition of water-treeing and may worsen it. Further, additional retardant can cause other problems such as bloom or sweat out of the water-tree retardant (i.e., migration of the water-tree retardant from an interior portion of the insulation layer to a surface of the insulation layer). Also, many additives that inhibit water treeing cause other problems such as large increases in dissipation factor. A problem to be solved then is to find a new polyolefin-containing formulation that better inhibits water-tree growth, and thereby electrical-tree growth, without migration and without a large increase in dissipation factor.

W

Our technical solution to this problem includes a polyolefin and polyvinylpyrrolidone formulation comprising (A) an olefin-based (co)polymer; (B) a polyvinylpyrrolidone (co)polymer; and (C) an antioxidant ("inventive formulation"). Also inventive are a method of making the inventive formulation; a crosslinked polyolefin product made by curing the inventive formulation ("inventive product"); manufactured articles comprising a shaped form of the inventive formulation or product ("inventive articles"); and methods of using the inventive formulation, product, or articles.

The inventive formulation, product, and articles are useful in electricity transmitting applications. Although the inventive formulation was conceived in the course of solving the aforementioned problems of insulated electrical conductors, the articles and uses of the inventive formulation are not limited to insulated electrical conductors or electricity transmitting and water treeing-inhibiting applications. Articles and uses of the inventive formulation also include other articles such as containers or vehicle parts and their ad rem uses.

DETAILED DESCRIPTION

The Summary and Abstract are incorporated here by reference. Certain inventive embodiments are described below as numbered aspects for easy cross-referencing.

Aspect 1. A polyolefin and polyvinylpyrrolidone formulation comprising from 79.99 to 99.94 weight percent (wt %) of (A) an olefin-based (co)polymer; from 0.05 to 20.0 wt % of (B) a polyvinylpyrrolidone (co)polymer; and from 0.01 to 1.5 wt % of (C) an antioxidant; with the proviso that the formulation is free of an anti-static agent and a carbon black.

Aspect 2. The polyolefin and polyvinylpyrrolidone formulation of aspect 1 wherein the (A) olefin-based (co)polymer is (i) an ethylene-based (co)polymer, a propylene-based (co)polymer, or a combination of any two or more thereof; or (ii) a polyethylene homopolymer, an ethylene/alpha-olefin copolymer, an ethylene/unsaturated carboxylic ester copolymer, an ethylene/olefin-functional hydrolyzable silane copolymer, or a combination (e.g., blend) of any two or more thereof. The polyolefin and polyvinylpyrrolidone formulation of aspect 1 defined by any one of limitations (i) to (vii): (i) the (A) olefin-based (co)polymer is a polyethylene homopolymer, an ethylene/alpha-olefin copolymer, an ethylene/unsaturated carboxylic ester copolymer, or an ethylene/olefin-functional hydrolyzable silane copolymer; (ii) the (A) ethylene-based (co)polymer is a polyethylene homopolymer; (iii) the (A) olefin-based (co)polymer is an ethylene/alpha-olefin copolymer; (iv) the (A) olefin-based (co)polymer is an ethylene/unsaturated carboxylic ester copolymer, (v) the (A) olefin-based (co)polymer is an ethylene/olefin-functional hydrolyzable silane copolymer; (vi) the (A) olefin-based (co)polymer is a combination (e.g., blend) of any two of limitations (i) to (v). In some aspects (A) is a low density polyethylene (LDPE).

Aspect 3. The polyolefin and polyvinylpyrrolidone formulation of aspect 1 or 2 wherein the (B) polyvinylpyrrolidone (co)polymer is a polyvinylpyrrolidone homopolymer or a polyvinylpyrrolidone/olefin comonomer copolymer. The polyolefin and polyvinylpyrrolidone formulation of aspect 1 or 2 defined by any one of limitations (i) to (xii): (i) the (B) polyvinylpyrrolidone (co)polymer is a polyvinylpyrrolidone homopolymer; (ii) the (B) polyvinylpyrrolidone (co)polymer is a polyvinylpyrrolidone/olefin comonomer copolymer; (iii) the (B) polyvinylpyrrolidone (co)polymer is a grafted polyvinylpyrrolidone/olefin comonomer copolymer; (iv) the (B) polyvinylpyrrolidone (co)polymer is a non-grafted polyvinylpyrrolidone/olefin comonomer copolymer; (v) the (B) polyvinylpyrrolidone (co)polymer is a polyvinylpyrrolidone/olefin comonomer copolymer made by copolymerizing vinylpyrrolidone and an olefin comonomer that is an unsaturated carboxylic ester, an unsaturated hydrocarbon, an olefin-functional organosilane, an olefin-functional organosiloxane, a hydroxystyrene, or a vinylbenzoic acid; (vi) the (B) polyvinylpyrrolidone (co)polymer is a polyvinylpyrrolidone/olefin comonomer copolymer made by copolymerizing vinylpyrrolidone and an olefin comonomer that is an unsaturated carboxylic ester; (vii) the (B) polyvinylpyrrolidone (co)polymer is a polyvinylpyrrolidone/olefin comonomer copolymer made by copolymerizing vinylpyrrolidone and an olefin comonomer that is an unsaturated hydrocarbon; (viii) the (B) polyvinylpyrrolidone (co) polymer is a polyvinylpyrrolidone/olefin comonomer copolymer made by copolymerizing vinylpyrrolidone and an olefin comonomer that is an olefin-functional organosilane; (ix) the (B) polyvinylpyrrolidone (co)polymer is a polyvinylpyrrolidone/olefin comonomer copolymer made by copolymerizing vinylpyrrolidone and an olefin comonomer that is an olefin-functional organosiloxane; (x) the (B) polyvinylpyrrolidone (co)polymer is a polyvinylpyrrolidone/olefin comonomer copolymer made by copolymerizing vinylpyrrolidone and an olefin comonomer that is a hydroxystyrene; (xi) the (B) polyvinylpyrrolidone (co)polymer is a polyvinylpyrrolidone/olefin comonomer copolymer made by copolymerizing vinylpyrrolidone and an olefin comonomer that is a vinylbenzoic acid; and (xii) the (B) polyvinylpyrrolidone (co)polymer is a combination of a polyvinylpyrrolidone homopolymer and a polyvinylpyrrolidone/olefin comonomer copolymer of any one of limitations (vi) to (xi). In aspect 1 or 2, in some embodiments the (B) polyvinylpyrrolidone (co)polymer is any one of constituents (B1) to (B5); alternatively any four of constituents (B1) to (B5), alternatively (B1), alternatively (B2), alternatively (B3), alternatively (B4), alternatively (B5), all described in the Examples later.

Aspect 4. The polyolefin and polyvinylpyrrolidone formulation of any one of aspects 1 to 3 wherein the (C) antioxidant is a hindered phenol, a phosphite, a phosphonite, a thio compound, an antioxidizing amine, or a combination of any two or more thereof. The polyolefin and polyvinylpyrrolidone formulation of any one of aspects 1 to 3 defined by any one of limitations (i) to (vii): (i) the (C) antioxidant is a hindered phenol, a phosphite, a phosphonite, a thio compound (sulfur atom-containing organic compound), or a polyamine; (ii) the (C) antioxidant is a hindered phenol; (iii) the (C) antioxidant is a phosphite; (iv) the (C) antioxidant is a phosphonite; (v) the (C) antioxidant is a thio compound (sulfur atom-containing organic compound); (vi) the (C) antioxidant is an antioxidizing amine; (vii) a combination of any two of limitations (ii) to (v), e.g., a combination of limitations (ii) and (v). In some aspects the (C) antioxidant is a hindered phenol that is tris[(4-tert-butyl-3-hydroxy-2,6-dimethylphenyl)methyl]-1,3,5-triazine-2,4,6-trione; alternatively the (C) antioxidant is a thio compound that is distearyl thiodipropionate ("DSTDP"); alternatively the (C) antioxidant is a combination of tris[(4-tert-butyl-3-hydroxy-2,6-dimethylphenyl)methyl]-1,3,5-triazine-2,4,6-trione and DSTDP. In some aspects the antioxidizing amine is an oligomeric amine, a polyamine, or a hindered amine.

Aspect 5. The polyolefin and polyvinylpyrrolidone formulation of any one of claims 1 to 4 wherein the polyolefin and polyvinylpyrrolidone formulation comprises from 80.50 to 99.70 wt % of the (A) olefin-based (co)polymer; from 0.10 to 15.0 wt % of the (B) polyvinylpyrrolidone (co)polymer; from 0.10 to 1.5 wt % of the (C) antioxidant; and from 0.1 to 3 wt % of (D) an organic peroxide; with the proviso that the formulation is free of an anti-static agent and a carbon black. The polyolefin and polyvinylpyrrolidone formulation of any one of aspects 1 to 4 defined by any one of limitations (i) to (vi): (i) the polyolefin and polyvinylpyrrolidone formulation comprises from 85.50 to 99.60 wt % of the (A) olefin-based (co)polymer; from 0.2 to 10.0 wt % of the (B) polyvinylpyrrolidone (co)polymer; from 0.1 to 1.5 wt % of the (C) antioxidant; and from 0.1 to 3 wt % of (D) an organic peroxide; with the proviso that the formulation is free of an anti-static agent and a carbon black; (ii) limitation (i) wherein the (D) organic peroxide is a monoperoxide of formula $R^O$—O—O—$R^O$ or a diperoxide of formula $R^O$—O—O—R—O—O—$R^O$, wherein each $R^O$ independently is a $(C_1$-$C_{20})$alkyl group or $(C_6$-$C_{20})$aryl group and R is a divalent hydrocarbon group; (iii) limitation (i) wherein the (D) organic peroxide is a monoperoxide of formula $R^O$—O—O—$R^O$ wherein each $R^O$ independently is a $(C_1$-$C_{20})$ alkyl group or $(C_6$-$C_{20})$aryl group; (iv) limitation (i) wherein the (D) organic peroxide is a diperoxide of formula $R^O$—O—O—R—O—O—$R^O$, wherein each $R^O$ independently is a $(C_1$-$C_{20})$alkyl group or $(C_6$-$C_{20})$aryl group and R is a divalent hydrocarbon group; (v) a combination of limitations (iii) and (iv); and (vi) the (D) organic peroxide is dicumyl peroxide.

Aspect 6. The polyolefin and polyvinylpyrrolidone formulation of any one of aspects 1 to 5 wherein the anti-static agent is an ethoxylated alkylamine, an ethoxylated dialkylamine, a fatty acid ester, a poly(ethylene glycol ester), a polyglycerol ester, a glycidyl ester, an alkyl sulfonate, a pentaerythritol ester, a sorbitan ester, or a diethanol amide of a carboxylic acid such as a diethanol amide of a fatty acid.

Aspect 7. The polyolefin and polyvinylpyrrolidone formulation of any one of aspects 1 to 6, further comprising at least one additive chosen from optional additives (E) to (K): (E) a stabilizer (e.g., a compound that inhibits ultraviolet (UV) light-associated degradation); (F) a scorch retardant; (G) an alkenyl-functional coagent; (H) a nucleating agent; (I) a processing aid; (J) an extender oil; and (K) nanoparticles. The additives differ from constituents (A) to (D) in at least composition and does not contradict or conflict with aspects 1 to 6.

Aspect 8. The polyolefin and polyvinylpyrrolidone formulation of any one of aspects 1 to 7, characterized by (i) an increase in water-tree length (WTL) of less than 10% when measured according to the Water-Tree Growth Test Method using ASTM D6097; (ii) a dissipation factor of less than 0.30%, when measured according to the Dissipation Factor Test Method; or both (i) and (ii). The polyolefin and polyvinylpyrrolidone formulation of any one of aspects 1 to 7, characterized by an increase in water-tree length (WTL) of less than 10%, alternatively less than 9%, alternatively less than 8.4%, when measured according to the Water-Tree Growth Test Method using ASTM D6097, described later; and/or the formulation is characterized by a dissipation factor of less than 0.30%, alternatively less than 0.20%, alternatively less than 0.15%, alternatively less than 0.14%, when measured according to the Dissipation Factor Test Method, described later. In some aspects the increase in WTL is from greater than 3.0% to <9%, alternatively from 3.3% to 8.4%, alternatively from 3.4% to 8.0%, alternatively from 3.4% to 5.9%. In some aspects the dissipation factor is from greater than 0.05% to 0.15%, alternatively from 0.06% to <0.13%, alternatively from 0.06% to 0.10%. The lower the increase in WTL, the better the formulation. The lower the dissipation factor, the better the formulation.

Aspect 9. The polyolefin and polyvinylpyrrolidone formulation of any one of aspects 1 to 8 comprising constituents (A) to (C), a (D) organic peroxide, and a (E) stabilizer, wherein the (A) olefin-based (co)polymer is a low density polyethylene containing comonomeric units derived from 1-butene, 1-hexene, or 1-octene; the (B) polyvinylpyrrolidone (co)polymer is a polyvinylpyrrolidone homopolymer having a weight-average molecular weight (Mw) from 10,000 to 40,000 grams per mole, a vinylpyrrolidone/vinyl acetate copolymer, or a polyvinylpyrrolidone-graft-(1-triacontene) copolymer; the (C) antioxidant is a hindered phenol, a thio compound, or a combination of a hindered phenol and a thio compound; and the (D) organic peroxide is dicumyl peroxide. The (E) may be N,N'-bisformyl-N,N'-(2,2,6,6-tetramethyl-4-piperidinyl)-hexamethylenediamine. The formulation may be free of any other water tree retardant (e.g., free of a polyethylene glycol, e.g., free of PEG 20000.

Aspect 10. A method of making the polyolefin and polyvinylpyrrolidone formulation of any one of aspects 1 to 9, the method comprising mixing the (B) polyvinylpyrrolidone (co)polymer and (C) antioxidant into a melt of the (A) olefin-based (co)polymer to give a melt blend comprising constituents (A), (B), and (C); optionally extruding the melt blend to give an extrudate comprising constituents (A), (B), and (C); optionally pelletizing the extrudate to give pellets comprising constituents (A), (B), and (C); and optionally adding (D) organic peroxide to the melt blend, extrudate, or pellets to give the polyolefin and polyvinylpyrrolidone formulation. In some aspects the method further comprises adding one or more optional additives (e.g., one or more of the constituents (E) to (K)) into the melt blend prior to or during the extruding step.

Aspect 11. A crosslinked polyolefin product that is a product of curing the polyolefin and polyvinylpyrrolidone formulation of any one of aspects 1 to 9.

Aspect 12. A manufactured article comprising a shaped form of the polyolefin and polyvinylpyrrolidone formulation of any one of aspects 1 to 9, the polyolefin and polyvinylpyrrolidone formulation made by the method of aspect 10, or the crosslinked polyolefin product of aspect 11. The shaped form of the manufactured article may cylindrical, helical, or irregular. In some aspects the manufactured article may be an insulation layer of an insulated electrical conductor of aspect 13 (below). In some aspects the manufactured article may be the insulated electrical conductor of aspect 13.

Aspect 13. An insulated electrical conductor comprising a conductive core and an insulation layer at least partially covering the conductive core, wherein at least a portion of the insulation layer comprises the polyolefin and polyvinylpyrrolidone formulation of any one of aspects 1 to 9, the polyolefin and polyvinylpyrrolidone formulation made by the method of aspect 10, or the crosslinked polyolefin product of aspect 11. The amount of the polyolefin and polyvinylpyrrolidone formulation in the insulation layer of the insulated electrical conductor may be a quantity that is effective for decreasing the water-tree length and/or decreasing the dissipation factor of the insulation layer. The insulation layer may be composed of a single layer, at least a portion of which is the inventive formulation or product; or composed of multiple layers, at least one layer of which comprises the inventive formulation or product. The insulated electrical conductor may be a coated wire or a power cable. The insulated electrical conductor is useful for electricity-transmitting/distributing applications, including low, medium, high, and ultra-high voltage applications.

Aspect 14. A method of conducting electricity, the method comprising applying a voltage across the conductive core of the insulated electrical conductor of aspect 13 so as to generate a flow of electricity through the conductive core. The applied voltage may be low (>0 to <5 kilovolts (kV)), medium (5 to <69 kV), high (69 to 230 kV), or extra-high (>230 kV).

Carbon black: a finely-divided form of paracrystalline carbon having a high surface area-to-volume ratio, but lower than that of activated carbon. Examples are furnace carbon black, acetylene carbon black, and conductive carbons (e.g., carbon fibers, carbon nanotubes, graphene, graphites, and expanded graphite platelets).

Coagent or curing coagent: a compound that enhances crosslinking. Examples are acyclic or cyclic compounds that contain carbon atoms in their respective backbone or ring substructure and terminal alkenyl groups bonded thereto.

(Co)polymer: a homopolymer and/or a copolymer.

Copolymer: a macromolecule, or collection of macromolecules, having monomeric units, made by polymerizing a monomer, and one or more different types of comonomeric units, made by polymerizing one or more comonomers. Monomers and comonomers are polymerizable molecules and different in structure from each other. A monomeric unit, also called a monomer unit or "mer", is the largest constitutional unit contributed by (derived from) a single monomer molecule to the structure of the macromolecule(s). A comonomeric unit, also called a comonomer unit, is the largest constitutional unit contributed by (derived from) a single comonomer molecule to the structure of the macromolecule(s). Common copolymers include a "bipolymer", which is made from one monomer and one comonomer; and a "terpolymer", which is a copolymer made from one monomer and two different comonomers.

Cure agent: a radical-generating compound that, after being subjected to an activation condition, forms a free-radical and initiates or enhances crosslinking of macromolecules, especially of the (A) olefin-based (co)polymer. Activation condition may be heat or light. Examples are peroxides, diazo-functional organic compounds, and 2,3-dimethyl-2,3-diphenylbutane. Peroxides are hydrogen-organic peroxides of formula H—O—O—R or the (D) organic peroxide. Cure agent is different in composition and function from the coagent.

Curing or crosslinking: forming a crosslinked product (network polymer).

Formulation: a single phase or multiphase, uniform or non-uniform, divided or continuous, crosslinkable, one-part, two-part, or three-part mixture, the total weight of which is 100.00 wt %. The divided solid form may comprise granules, pellets, powder, or a combination of any two or more thereof. The continuous form may be a molded part (e.g., blow molded part) or an extruded part (e.g., an insulation layer of an insulated electrical conductor).

Hindered phenol: a hydroxybenzene containing bulky groups at ortho positions to the hydroxyl and having an antioxidizing property. The bulky groups may be independent alkyl groups, e.g., isopropyl, tertiary-butyl, neopentyl.

Homopolymer: a macromolecule, or collection of macromolecules, composed of repeat units consisting of monomeric units derived from only one monomer and no comonomer. The monomer may be a real or actual monomer. Homopolymer may exclude macromolecules derived from implicit or hypothetical monomers.

(Meth)acrylate: an acrylate, methacrylate, or a combination thereof. The (meth)acrylate may be unsubstituted.

Olefin-based (co)polymer: a polyolefin homopolymer (100 wt % olefinic monomeric units and 0 wt % comonomeric units) or an olefin-based copolymer Olefin-based copolymer or olefin/comonomer copolymer: macromolecules having a simple majority, alternatively from 50 to <100 wt %, alternatively an absolute majority of monomeric units derived from an olefin hydrocarbon such as ethylene ($CH_2$=$CH_2$) or propylene ($CH_2$=$CHCH_3$), and a simple minority, alternatively from >0 to 50 wt %, alternatively an absolute minority of comonomeric units derived from one or more comonomers. Examples of comonomers are $(C_3-C_{20})$alpha-olefins, dienes, vinyl silanes, vinyl acetate, and alkyl acrylates.

Polyvinylpyrrolidone (co)polymer: includes a polyvinylpyrrolidone homopolymer and a copolymer of vinylpyrrolidone and olefin comonomer, which lacks a pyrrolidone group.

Vinylpyrrolidone: the compound 1-vinyl-2-pyrrolidone, also known as N-vinylpyrrolidone, and having CAS number 88-12-0.

The polyolefin and polyvinylpyrrolidone formulation (polyolefin and polyvinylpyrrolidone-containing formulation or inventive formulation) may be made different ways. For example, mixing a melt of the (A) ethylene-based (co)polymer with the (B) PVP (co)polymer, and constituent (C) antioxidant, and any optional constituents (e.g., any zero, one or more of constituents (D) to (K)), to give the polyolefin and polyvinylpyrrolidone formulation as an admixture of constituents (A), (B), (C), and the any optional constituents. The mixing may comprise compounding, kneading, or extruding. To facilitate mixing one or more constituents (e.g., (B), (C), additives (D), (E), (F), etc.) may be provided in the form of an additive masterbatch in a portion of (A) or as a dispersion of additive in a carrier resin other than (A). The carrier resin may be a polypropylene polymer. The (D) organic peroxide may alternatively be added by an imbibing, injecting, or soaking method, comprising coating surfaces of pellets of a blend of constituents (A), (B), (C), and any optional constituents, with the (D) organic peroxide. The imbibing, injecting, or soaking may be carried out at a temperature from about 20° to 100° C. for 0.1 to 100 hours, e.g., 60° to 80° C. for 0.1 to 24 hours. Higher temperatures may be used for the imbibing, injecting, or soaking with the proviso that any (D) organic peroxide does not undergo significant amount of decomposition temperature. If desired the polyolefin and polyvinylpyrrolidone formulation may be cooled to a storage temperature (e.g., 23° C.) and stored for a period of time of 1 hour, 1 week, 1 month, or longer. The polyolefin and polyvinylpyrrolidone formulation may be crosslinked by irradiation curing or organic peroxide/heat curing.

The polyolefin and polyvinylpyrrolidone formulation may be free of any carbon-containing backbone-based polymer other than constituents (A), (B), (C), and any carbon-containing backbone-based polymer embodiments of optional constituents (D) to (K). in some aspects the polyolefin and polyvinylpyrrolidone formulation may be free of at least one of, alternatively each of a polypropylene carrier resin; a polypropylene homopolymer; a propylene/ethylene copolymer containing 50 to <100 wt % propylenic monomeric units and 50 to 0 wt % ethylenic comonomeric units; and a propylene/ethylene/diene (EPDM) copolymer containing 50 to <100 wt % propylenic monomeric units, 49 to >0 wt % of ethylenic units, and 20 to 1 wt % dienic comonomeric units. Alternatively the (A) olefin-based (co)polymer of the polyolefin and polyvinylpyrrolidone formulation may comprise a polypropylene homopolymer containing 99 to 100 wt % propylenic monomeric units; a propylene/ethylene copolymer containing 50 to <100 wt % propylenic monomeric units and 50 to 0 wt % ethylenic comonomeric units; or a propylene/ethylene/diene (EPDM) copolymer containing 50 to <100 wt % propylenic monomeric units, 49 to >0 wt % of ethylenic units, and 20 to 1 wt % dienic comonomeric units. The diene used to make the dienic comonomeric units may be 1,3-butadiene; 1,5-hexadiene; 1,7-octadiene; ethylidene norbornene; dicyclopentadiene; or vinyl norbornene.

The constituent (A) olefin-based (co)polymer: a single phase or multiphase, uniform or non-uniform, continuous phase or discontinuous phase, crosslinkable macromolecule composed of repeat units made from olefin monomer and optionally one or more olefin-functional comonomers, wherein the macromolecule has a backbone consisting essentially of, or consisting of carbon atoms, or a collection of such crosslinkable macromolecules, which yield a network structure upon being crosslinked. The (A) may be a polyolefin homopolymer such as a polyethylene homopolymer containing repeat units derived from ethylene; or an olefin-based copolymer such as an ethylene/alpha-olefin interpolymer, also referred to as a copolymer, containing repeat units derived from ethylene and repeat units derived from an alpha-olefin comonomer, which is different than ethylene; or an ethylene/unsaturated carboxylic ester copolymer comprising from 51 to 99.9 wt % ethylenic monomeric units and from 49 to 0.1 wt % unsaturated carboxylic ester comonomeric units; or an ethylene/olefin-functional hydrolyzable silane copolymer comprising from 51 to 99.9 wt % ethylenic monomeric units and from 49 to 0.1 wt % olefin-functional hydrolyzable silane comonomeric units. Interpolymer includes bipolymers, terpolymers, etc. The (A) may be a polypropylene such as a P-laser product available from Prysmian Group, Milan, Italy.

The (A) olefin-based (co)polymer may be the ethylene-based (co)polymer or propylene-based (co)polymer. The ethylene-based (co)polymer may be a polyethylene homopolymer containing 99 to 100 wt % ethylenic monomeric units. The polyethylene homopolymer may be high density polyethylene (HDPE) homopolymer made by coordination polymerization or a low density polyethylene (LDPE) homopolymer made by radical polymerization.

Alternatively, the (A) olefin-based (co)polymer may be an ethylene/alpha-olefin copolymer containing 50 to <100 wt % ethylenic monomeric units and 50 to 0 wt % $(C_3-C_{20})$ alpha-olefin-derived comonomeric units. The ethylene/alpha-olefin copolymer embodiment of the ethylene/alpha-olefin copolymer may be a linear low density polyethylene (LLDPE), medium density polyethylene (MDPE), or high density polyethylene (HDPE). Alternatively, the polyethylene polymer may be a low density polyethylene (LDPE). The ethylene/alpha-olefin (alpha-olefin also written as "α-olefin") interpolymer having an alpha-olefin content of at least 1 wt %, at least 5 wt %, at least 10 wt %, at least 15 wt %, at least 20 wt %, or at least 25 wt % based on the entire interpolymer weight. These interpolymers can have an alpha-olefin content of less than 50 wt %, less than 45 wt %, less than 40 wt %, or less than 35 wt % based on the entire interpolymer weight. Illustrative ethylene/alpha-olefin interpolymers are ethylene/propylene, ethylene/1-butene, ethylene/1-hexene, ethylene/1-octene, ethylene/diene containing from 20 to 1 wt % diene comonomeric units, ethylene/propylene/1-octene, ethylene/propylene/1-butene, ethylene/1-butene/1-octene, ethylene/propylene/diene (EPDM) containing 50 to 100 wt % ethylene monomeric units, 49 to >0 wt % of propylene comonomeric units, and 20 to 1 wt % diene comonomeric units. The diene used to make the diene comonomeric units in the ethylene/diene copolymer or in EPDM independently may be 1,3-butadiene; 1,5-hexadiene; 1,7-octadiene; ethylidene norbornene; dicyclopentadiene; vinyl norbornene; or a combination of any two or more thereof.

The $(C_3-C_{20})$alpha-olefin of the ethylene/alpha-olefin copolymer aspect of the (A) olefin-based (co)polymer may be a compound of formula (I): $H_2C=C(H)-R$ (I), wherein R is a straight chain $(C_1-C_{18})$alkyl group. The $(C_1-C_{18})$alkyl group is a monovalent unsubstituted saturated hydrocarbon having from 1 to 18 carbon atoms, alternatively 2 to 18 carbon atoms, alternatively 2 to 6 carbon atoms. Examples of R are methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, and octadecyl. In some embodiments the $(C_3-C_{20})$alpha-olefin is 1-propene, 1-butene, 1-hexene, or 1-octene; alternatively 1-butene, 1-hexene, or 1-octene; alternatively 1-butene or 1-hexene; alternatively 1-butene or 1-octene; alternatively 1-hexene or 1-octene; alternatively 1-butene; alternatively 1-hexene; alternatively 1-octene; alternatively a combination of any two of 1-butene, 1-hexene, and 1-octene. Alternatively, the alpha-olefin may have a cyclic structure such as cyclohexane or cyclopentane, resulting in an alpha-olefin such as 3-cyclohexyl-1-propene (allyl cyclohexane) and vinyl cyclohexane. The $(C_3-C_{20})$alpha-olefin may be used as a comonomer with ethylene monomer or propylene monomer.

The ethylene/unsaturated carboxylic ester copolymer embodiment of the (A) olefin-based (co)polymer is made by copolymerizing ethylene monomer and at least one unsaturated carboxylic ester comonomer. Each unsaturated carboxylic ester comonomer may independently have hydrogen atoms and from 3 to 20 carbon atoms per molecule, i.e., be a $(C_3-C_{20})$unsaturated carboxylic ester comonomer. In some aspects the unsaturated carboxylic ester comonomer may be a vinyl $(C_2-C_8)$carboxylate and the ethylene/unsaturated carboxylic ester copolymer is an ethylene-vinyl $(C_2-C_8)$ carboxylate copolymer, which may have a vinyl $(C_2-C_8)$ carboxylate comonomeric content from >0 to <3.5 wt %, alternatively from >0 to 3.0 wt %, alternatively from >0 to 2.0 wt %, alternatively from 0.5 to 2.0 wt % based on total weight of the ethylene-vinyl $(C_2-C_8)$carboxylate copolymer. In some aspects the vinyl $(C_2-C_8)$carboxylate is a vinyl ester of a carboxylic acid anion having from 2 to 8 carbon atoms, alternatively 2 to 4 carbon atoms. The vinyl $(C_2-C_8)$carboxylate may be a vinyl $(C_2-C_4)$carboxylate such as vinyl acetate, vinyl propionate, or vinyl butanoate and the ethylene/unsaturated carboxylic ester copolymer may be an ethylene-vinyl $(C_2-C_4)$carboxylate bipolymer, alternatively an ethylene-vinyl acetate (EVA) bipolymer, alternatively an ethylene-vinyl propionate bipolymer, alternatively an ethylene-vinyl butanoate bipolymer. The EVA bipolymer consists essentially of ethylene-derived monomeric units and vinyl acetate-derived comonomeric units. The vinyl acetate comonomeric unit content of the EVA bipolymer may be from >0 to <3.5 wt %, alternatively from >0 to 3.0 wt %, alternatively from >0 to 2.0 wt %, alternatively from 0.5 to 2.0 wt % based on total weight of the EVA bipolymer. The wt % values are on average per molecule of the EVA. Alternatively or additionally, the (A) (e.g., EVA bipolymer) may have a melt index (190° C., 2.16 kg) of from 2 to 60 g/10 min., alternatively 5 to 40 g/10 min. measured by ASTM D1238-04.

The unsaturated carboxylic ester comonomer used to make the ethylene/unsaturated carboxylic ester copolymer embodiment of the (A) olefin-based (co)polymer may be a $(C_1-C_8)$alkyl (meth)acrylate and the ethylene/unsaturated carboxylic ester copolymer is an ethylene-$(C_1-C_8)$alkyl (meth)acrylate copolymer (EAA), which may have a $(C_1-C_8)$alkyl (meth)acrylate comonomeric content from >0 to <3.5 wt %, alternatively from >0 to 3.0 wt %, alternatively from >0 to 2.0 wt %, alternatively from 0.5 to 2.0 wt %, based on total weight of the ethylene-$(C_1-C_8)$alkyl (meth) acrylate copolymer. In some aspects the $(C_1-C_8)$alkyl may be a $(C_1-C_4)$alkyl, $(C_5-C_8)$alkyl, or $(C_2-C_4)$alkyl. The EAA consists essentially of ethylene-derived monomeric units and one or more different types of $(C_1-C_8)$alkyl (meth) acrylate-derived comonomeric units such as ethyl acrylate and/or ethyl methacrylate comonomeric units. The $(C_1-C_8)$ alkyl may be methyl, ethyl, 1,1-dimethylethyl, butyl, or 2-ethylhexyl. The (meth)acrylate may be acrylate, methacrylate, or a combination thereof. The $(C_1-C_8)$alkyl (meth) acrylate may be ethyl acrylate and the EAA may be ethylene-ethyl acrylate copolymer (EEA) or the $(C_1-C_8)$alkyl (meth)acrylate may be ethyl methacrylate and the EAA may be ethylene-ethyl methacrylate copolymer (EEMA). The ethyl acrylate or ethyl methacrylate comonomeric unit content of EEA or EEMA, respectively, may independently be from >0 to <3.5 wt %, alternatively from >0 to 3.0 wt %, alternatively from >0 to 2.0 wt %, alternatively from 0.5 to 2.0 wt % based on total weight of the EEA or EEMA bipolymer.

The olefin-functional hydrolyzable silane comonomer used to make the ethylene/olefin-functional hydrolyzable silane copolymer embodiment of the (A) olefin-based (co) polymer may the hydrolyzable silane monomer of paragraph [0019] of WO 2016/200600 A1 (PCT/US16/033879 filed May 24, 2016) to Chaudhary; or of U.S. Pat. No. 5,266,627 to Meverden et al. The olefin-functional hydrolyzable silane may be grafted (post-reactor) onto the copolymer embodiment of the (A). Alternatively, the olefin-functional hydrolyzable silane may be copolymerized with ethylene and the comonomer to directly make the copolymer embodiment containing hydrolyzable silyl groups. In some aspects the olefin-functional hydrolyzable silane is vinyltrimethoxysilane (VTMS), vinyltriethoxysilane (VTES), vinyltriacetoxysilane, or gamma-(meth)acryloxy propyl trimethoxy silane and the hydrolyzable silyl groups are 2-trimethoxysilylethyl, 2-triethoxysilylethyl, 2-triacetoxysilylethyl, or 3-trimethoxysilylpropyloxycarbonylethyl or 3-trimethoxysilylpropyloxycarbonylpropyl.

The (A) olefin-based (co)polymer may be a blend of two or more different olefin-based (co)polymers or a reactor product of polymerization reactions with two or more different catalysts. The (A) olefin-based (co)polymer may be made in two or more reactors, such as ELITE™ polymers from The Dow Chemical Company.

The (A) olefin-based (co)polymer may be made by any conventional or hereafter discovered production process, many are already known in the art, comprising one or more polymerization reactions. For example, the LDPE may be prepared using a high pressure polymerization process. Alternatively, the LDPE may be prepared using a coordination polymerization process conducted using one or more polymerization catalysts such as Ziegler-Natta, chromium oxide, metallocene, post-metallocene catalysts. Suitable temperatures are from 0° to 250° C., or 30° or 200° C. Suitable pressures are from atmospheric pressure (101 kPa) to 10,000 atmospheres (approximately 1,013 MegaPascals ("MPa")). In most polymerization reactions, the molar ratio of catalyst to polymerizable olefins (monomer/comonomer) employed is from $10^{-12}:1$ to $10^{-1}:1$, or from $10^{-9}:1$ to $10^{-5}:1$.

The amount of the (A) olefin-based (co)polymer in the polyolefin and polyvinylpyrrolidone formulation may be from 80.0 to 99.88 wt %, alternatively from 85.0 to 99.0 wt %, alternatively from 90.5 to 98 wt % of the inventive formulation.

Constituent (B): poly(vinylpyrrolidone) (co)polymer (PVP (co)polymer). The poly(vinylpyrrolidone) (PVP) copolymer comprises monomeric units derived from monomer vinyl pyrrolidone and comonomeric units derived from at least one olefin comonomer, which is different than vinyl pyrrolidone. The PVP copolymer may be a hydrocarbylene-grafted PVP copolymer (described later) or a non-grafted PVP copolymer.

The non-grafted PVP copolymer aspect of (B) may be made by copolymerizing vinyl pyrrolidone with the at least one olefin monomer. The non-grafted PVP copolymer may be a random copolymer or a block copolymer. The at least one olefin comonomer used to make the PVP copolymer may be any olefinically unsaturated compound having a molecular weight of less than 500 g/mol. Each olefin comonomer independently is an unsaturated carboxylic ester, an unsaturated hydrocarbon, an olefin-functional organosilane, an olefin-functional organosiloxane, a hydroxystyrene, or a vinylbenzoic acid. The unsaturated carboxylic ester may be a vinyl carboxylic ester, such as vinyl acetate, an alkyl (meth)acrylate, methyl vinylbenzoate, or vinylbenzyl acetate. The alkyl (meth)acrylate may be methyl acrylate, ethyl acrylate, methyl methacrylate, ethyl methacrylate, butyl acrylate, or isobutyl acrylate (1-methylpropyl acrylate). The unsaturated hydrocarbon may be a $(C_3-C_{20})$alpha-olefin, a vinyl-functional benzene, an unsaturated ether, or an unconjugated polyene. Each $(C_3-C_{20})$alpha-olefin independently may be a $(C_4-C_{20})$alpha-olefin, a $(C_6-C_{20})$alpha-olefin, a $(C_4-C_8)$alpha-olefin, 1-butene, 1-hexene, or 1-octene. The vinyl-functional benzene may be styrene; 1,2-divinylbenzene; 1,3-divinylbenzene; 1,4-divinylbenzene; 2-methyl-styrene; 3-methyl-styrene; 4-methyl-styrene; or 2,4-dimethyl-styrene. The unsaturated ether may be a methoxy-styrene. The unconjugated polyene may be 5-ethylidene-2-norbornene (ENB), 5-vinyl-2-norbornene (VNB), or dicyclopentadiene (DCPD). The olefin-functional organosilane may be vinyl trimethylsilane or vinyl triethylsilane. The olefin-functional organosiloxane may be vinyl trimethoxysilane, vinyl triethoxysilane, or vinyl tris(2-methoxyethoxy) silane. Any one of the foregoing olefin comonomers may be halogen-free or substituted with a chlorine atom, such as a chloro-substituted styrene such as 4-chlorostyrene.

An example of a polyvinylpyrrolidone homopolymer is of formula (I):

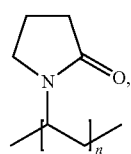

(I)

wherein subscript n is an integer of greater than 4, e.g., from 5 to 10,000.

An example of a non-grafted polyvinylpyrrolidone copolymer with vinyl acetate is of formula (IIa):

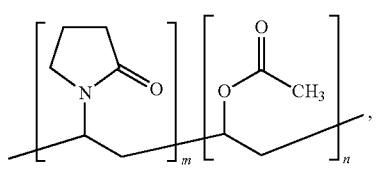

(IIa)

each of subscripts m and n independently is an integer greater than 4, e.g., from 5 to 10,000.

The hydrocarbylene-grafted PVP copolymer aspect of (B) comprises: (i) one monovalent poly(vinylpyrrolidone) homopolymeric segment consisting essentially of vinylpyrrolidone monomeric units; and one $(C_{10}-C_{50})$hydrocarbyl segment (monovalent); or (ii) two monovalent poly(vinylpyrrolidone) homopolymeric segments independently consisting essentially of vinylpyrrolidone monomeric units; and one $(C_{10}-C_{50})$hydrocarbylene segment (divalent), alternatively an interior $(C_{10}-C_{50})$alkylene segment (divalent). The $(C_{10}-C_{50})$hydrocarbyl(ene) segment may be a $(C_{20}-C_{40})$alkyl(ene) segment, e.g., $(C_{30})$alkyl (e.g., derived from 1-triacontene) or $(C_{30})$alkylene (e.g., derived from triaconta-1,3-diene), respectively. Polyvinylpyrrolidone copolymer grafted with the $(C_{30})$alkylene segment is shown in formula (IIb):

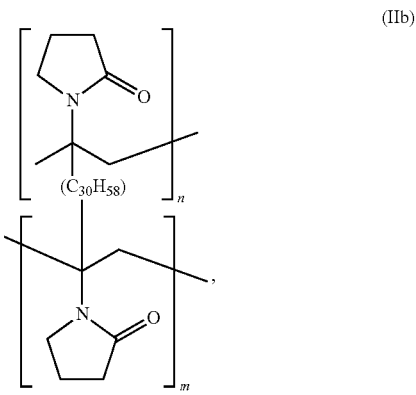

(IIb)

wherein subscript m is 0 or n, wherein when m is 0 the $(C_{30}H_{58})$ in formula (IIb) becomes monovalent $(C_{30}H_{59})$; and each subscript n independently is an integer greater than 4, e.g., from 5 to 10,000.

The (B) PVP (co)polymer may have a weight-average molecular weight (Mw) from 1,000 to 500,000 grams per mole (g/mol), alternatively from 5,000 to 50,000 g/mol, alternatively from 8,000 to 30,000 g/mol, as calculated from a Mark-Houwink-Sakurada equation, $[\eta]=KM^\alpha$, wherein M is molecular weight, K is $4.1\times10^{-3}$, $\alpha$ is 0.85; and $[\eta]$ is intrinsic viscosity as measured by ASTM D2857. The K and a values were measured for a standard polyvinylpyrrolidone at temperature 298.15 Kelvin and are reported in J. Brandrup and E. H. Immergut, *Polymer Handbook,* Wiley Interscience, New York, 1975. See also *Thermodynamics of aqueous solutions of polyvinylpyrrolidone,* by Rahmat Sadeghi, et al., J. Chem. Thermodynamics, 2004; vol. 36; pages 665 to 670.

The (B) PVP (co)polymer may be 0.05 to 20.0 wt %, alternatively 0.1 to 15 wt %, alternatively 0.2 to 10 wt %, alternatively 0.2 to 5 wt %, alternatively 0.1 to 3 wt % of the inventive formulation.

The constituent (C) antioxidant. The (C) antioxidant functions to provide antioxidizing properties to the polyolefin and polyvinylpyrrolidone formulation and/or peroxide-cured semiconducting product. The (C) may be a hindered phenol (e.g., tetrakis [methylene (3,5-di-t-butyl-4-hydroxyhydrocinnamate)] methane), a phosphite, a phosphonite (e.g., tris (2,4-di-t-butylphenyl) phosphate), a thio compound (e.g., dilaurylthiodipropionate), or an antioxidizing amine (e.g., an oligomeric amine, a hindered amine, or a polyamine such as a polymerized 2,2,4-trimethyl-1,2-dihydroquinoline). Examples of suitable (C) are bis(4-(1-methyl- 1-phenylethyl)phenyl)amine (e.g., NAUGARD 445); 2,2'-methylene-bis(4-methyl-6-t-butylphenol) (e.g., VANOX MBPC); 2,2'-thiobis(2-t-butyl-5-methylphenol (CAS No. 90-66-4, commercially LOWINOX TBM-6); 2,2'-thiobis(6-t-butyl-4-methylphenol (CAS No. 90-66-4, commercially LOWINOX TBP-6); tris[(4-tert-butyl-3-hydroxy-2,6-dimethylphenyl)methyl]-1,3,5-triazine-2,4,6-trione (e.g., CYANOX 1790); pentaerythritol tetrakis(3-(3,5-bis(1,1-dimethylethyl)-4-hydroxyphenyl)propionate (e.g., IRGANOX 1010, CAS Number 6683-19-8); 3,5-bis(1,1-dimethylethyl)-4-hydroxybenzenepropanoic acid 2,2'-thiodiethanediyl ester (e.g., IRGANOX 1035, CAS Number 41484-35-9); and distearyl thiodipropionate ("DSTDP"). In some aspects (C) is bis(4-(1-methyl-1-phenylethyl)phenyl)amine (e.g., NAUGARD 445, which is available from Addivant, Danbury, Conn., U.S.A.). The (C) may be 0.01 to 1.5 wt %, alternatively 0.05 to 1.2 wt %, alternatively 0.1 to 1.0 wt % of the inventive formulation.

Constituent (D):organic peroxide: a compound containing one or two C—O—O—C groups and lacking —O—O—H. A (D) organic monoperoxide is of formula $R^O$—O—O—$R^O$, wherein each $R^O$ independently is a $(C_1-C_{20})$alkyl group or $(C_6-C_{20})$aryl group. Each $(C_1-C_{20})$alkyl group independently is unsubstituted or substituted with 1 or 2 $(C_6-C_{12})$ aryl groups. Each $(C_6-C_{20})$aryl group is unsubstituted or substituted with 1 to 4 $(C_1-C_{10})$alkyl groups. A (D) organic diperoxide is of formula $R^O$—O—O—R—O—O—$R^O$, wherein R is a divalent hydrocarbon group such as a $(C_2-C_{10})$alkylene, $(C_3-C_{10})$cycloalkylene, or phenylene, and each $R^O$ is as defined above. The (D) organic peroxide may be bis(1,1-dimethylethyl) peroxide; bis(1,1-dimethylpropyl) peroxide; 2,5-dimethyl-2,5-bis(1,1-dimethylethylperoxy) hexane; 2,5-dimethyl-2,5-bis(1,1-dimethylethylperoxy) hexyne; 4,4-bis(1,1-dimethylethylperoxy) valeric acid; butyl ester; 1,1-bis(1,1-dimethylethylperoxy)-3,3,5-trimethylcyclohexane; benzoyl peroxide; tert-butyl peroxybenzoate; di-tert-amyl peroxide ("DTAP"); bis(alpha-t-butylperoxyisopropyl) benzene ("BIPB"); isopropylcumyl t-butyl peroxide; t-butylcumylperoxide; di-t-butyl peroxide; 2,5-bis (t-butylperoxy)-2,5-dimethylhexane; 2,5-bis(t-butylperoxy)-2,5-dimethylhexyne-3,1,1-bis(t-butylperoxy)-3,3,5-trimethylcyclohexane; isopropylcumyl cumylperoxide; butyl 4,4-di(tert-butylperoxy) valerate; or di(isopropyl-cumyl) peroxide; or dicumyl peroxide. The (D) organic peroxide may be dicumyl peroxide. A blend of two or more (D) organic peroxides may be used, e.g., a 20:80 (wt/wt) blend of t-butyl cumyl peroxide and bis(t-butyl peroxy isopropyl)benzene (e.g., LUPEROX D4466, which is commercially available from Arkema). In some aspects at least one, alternatively each (D) organic peroxide contains one —O—O— group. In some aspects the polyolefin and polyvinylpyrrolidone formulation and crosslinked polyolefin product is free of (D). When present, the (D) organic peroxide may be 0.05 to 3 wt %, alternatively 0.1 to 3.0 wt %, alternatively 0.5 to 2.5 wt %, alternatively 1.0 to 2.0 wt % of the inventive formulation. The weight/weight ratio of (C) antioxidant to all (D) organic peroxide, if any, is from >0 to less than 2 ((C)/(D) (wt/wt) is from >0 to <2).

The optional constituent (E) stabilizer. A particulate solid having an average particle size of 18 to 22 nanometers (nm). (E) may be a hydrophobized fumed silica such as those commercially available under the CAB-O-SIL trade name from Cabot Corporation. The (E) UV stabilizer may also have flame retardant effects. In some aspects the polyolefin and polyvinylpyrrolidone formulation and crosslinked polyolefin product is free of (E). When present, the (E) stabilizer may be from 0.01 to 1.5 wt %, alternatively 0.05 to 1.0 wt % of the inventive formulation.

The optional constituent (F) scorch retardant. A molecule that inhibits premature curing, or a collection of such molecules. Examples of a scorch retardant are hindered phenols; semi-hindered phenols; TEMPO; TEMPO derivatives; 1,1-diphenylethylene; 2,4-diphenyl-4-methyl-1-pentene (also known as alpha-methyl styrene dimer or AMSD); and allyl-containing compounds described in U.S. Pat. No. 6,277,925B1, column 2, line 62, to column 3, line 46. In some aspects the polyolefin and polyvinylpyrrolidone formulation and crosslinked polyolefin product is free of (F). When present, the (F) scorch retardant may be from 0.01 to 0.5 wt %, alternatively 0.05 to 0.12 wt % of the inventive formulation.

The optional constituent (G) alkenyl-functional coagent. A molecule that contains a backbone or ring substructure and one, alternatively two or more propenyl, acrylate, and/or vinyl groups bonded thereto, wherein the substructure is composed of carbon atoms and optionally nitrogen atoms, or a collection of such molecules. The (G) conventional coagent may be free of silicon atoms. The (G) alkenyl-functional coagent may be a propenyl-functional conventional coagent as described by any one of limitations (i) to (v): (i) (G) is 2-allylphenyl allyl ether; 4-isopropenyl-2,6-dimethylphenyl allyl ether; 2,6-dimethyl-4-allylphenyl allyl ether; 2-methoxy-4-allylphenyl allyl ether; 2,2'-diallyl bisphenol A; O,O'-diallyl bisphenol A; or tetramethyl diallyl-bisphenol A; (ii) (G) is 2,4-diphenyl-4-methyl-1-pentene or 1,3-diisopropenylbenzene; (iii) (G) is triallyl isocyanurate ("TAIC"); triallyl cyanurate ("TAC"); triallyl trimellitate ("TATM"); N,N,N',N',N'',N''-hexaallyl-1,3,5-triazine-2,4,6-triamine ("HATATA"; also known as $N^2,N^2,N^4,N^4,N^6,N^6$-hexaallyl-1,3,5-triazine-2,4,6-triamine); triallyl orthoformate; pentaerythritol triallyl ether; triallyl citrate; or triallyl aconitate; (iv) (G) is a mixture of any two of the propenyl-functional coagents in (i). Alternatively, the (G) may be an acrylate-functional conventional coagent selected from trimethylolpropane triacrylate ("TMPTA"), trimethylolpropane trimethylacrylate ("TMPTMA"), ethoxylated bisphenol A dimethacrylate, 1,6-hexanediol diacrylate, pentaerythritol tetraacrylate, dipentaerythritol pentaacrylate, tris(2-hydroxyethyl) isocyanurate triacrylate, and propoxylated glyceryl triacrylate. Alternatively, the (G) may be a vinyl-functional conventional coagent selected from polybutadiene having at least 50 wt % 1,2-vinyl content and trivinyl cyclohexane ("TVCH"). Alternatively, the (G) may be a conventional coagent described in U.S. Pat. No. 5,346,961 or U.S. Pat. No. 4,018,852. Alternatively, the (G) may be a combination or any two or more of the foregoing coagents. In some aspects the polyolefin and polyvinylpyrrolidone formulation and crosslinked polyolefin product is free of (G). When present, the (G) coagent may be 0.01 to 2 wt %, alternatively 0.01 to 1.5 wt %, alternatively 0.05 to 1.0 wt %, alternatively 0.1 to 0.5 wt % of the inventive formulation.

The optional constituent (H) nucleating agent. An organic or inorganic additive that that enhances the rate of crystallization of a polyolefin polymer. Examples of (L) are calcium carbonate, titanium dioxide, barium sulfate, ultra-high-molecular-weight polyethylene, potassium hydrogen phthalate, benzoic acid compounds, sodium benzoate compounds, disodium bicyclo[2.2.1]heptane-2,3-dicarboxylate, zinc monoglycerolate, and 1,2-cyclohexanedicarboxylic acid, calcium salt:zinc stearate. In some aspects the polyolefin and polyvinylpyrrolidone formulation and crosslinked polyolefin product is free of (H). When present, the (H) may be in a concentration of from 0.01 to 1.5 wt %, alternatively 0.05 to 1.2 wt %, alternatively 0.1 to 0.5 wt % of the inventive formulation.

The optional constituent (I) processing aid. Examples of (I) are fluoroelastomers. In some aspects the polyolefin and polyvinylpyrrolidone formulation and crosslinked polyolefin product is free of (I). When present, the (I) processing aid may be from 0.01 to 1.5 wt %, alternatively 0.02 to 1.2 wt %, alternatively 0.05 to 1.0 wt % of the inventive formulation.

The optional constituent (J) extender oil. Examples of (J) are mineral oils, paraffin oil, and combinations thereof. In some aspects the polyolefin and polyvinylpyrrolidone formulation and crosslinked polyolefin product is free of (J). When present, the (J) extender oil may be from 0.01 to 1.5 wt %, alternatively 0.1 to 1.0 wt % of the inventive formulation.

The optional constituent (K) nanoparticles. Examples of (K) are nanoparticulate forms of magnesium oxide (MgO), organomontmorillontie, silica, and combinations thereof. As used herein, the (K) nanoparticles have average diameters of from 1 to 100 nanometers (nm) as measured by Tunable Resistive Pulse Sensing (TRPS). The (K) nanoparticles may be uncoated, alternatively coated with a coating material such as a hydrophobic silicon-based coating material. In some aspects the (K) is silica nanoparticles having an average diameter from 1 to 100 nm as measured in water according to ERM-FD100, *Certification of Equivalent Spherical Diameters of Silica Nanoparticles in Water,* 2011, by A. Braun, et al., European Commission, Joint Research Centre, Institute for Reference Materials and Measurements, Geel, Belgium. In some aspects the polyolefin and polyvinylpyrrolidone formulation and crosslinked polyolefin product is free of (K). When present, the (K) nanoparticles may be from 0.01 to 1.5 wt %, alternatively 0.05 to 1.2 wt %, alternatively 0.1 to 1.0 wt % of the inventive formulation.

Optional additives (D) to (K) may be used to impart to either to the inventive formulation and/or inventive product one or more beneficial properties. Additives (D) to (K) are distinct compounds/materials from constituents (A) to (C) and from each other.

The polyolefin and polyvinylpyrrolidone formulation independently may not, alternatively may further comprise 0.005 to 0.5 wt % each of one or more secondary optional additives selected from a carrier resin, a corrosion inhibitor (e.g., $SnSO_4$), a lubricant, an anti-blocking agent, a slip agent, a plasticizer, a tackifier, a surfactant, an acid scavenger, a voltage stabilizer, a metal deactivator, and a water-tree growth retardant other than constituent (B). The water-tree growth retardant other than (B) may be a polyethylene glycol (e.g., PEG 20000), which if used is at a low enough concentration to avoid any negative impact on dissipation factor of the formulation.

Any optional additives (E) to (K) and any secondary optional additives may be added in place of a corresponding amount of constituent (A) in the inventive formulation, with the proviso that the amount of (A) in the formulation is at least 69 wt %, alternatively at least 79.9 wt %.

The crosslinked polyolefin product (inventive product): contains networked polyolefinic resins that contain C—C bond crosslinks formed during curing of the polyolefin and polyvinylpyrrolidone formulation. The crosslinked polyolefin product is made by coupling the constituents (A), (B), (C), and optionally (G) alkenyl-functional coagent in the presence of the (D) organic peroxide. Alternatively, the crosslinked polyolefin product may be made by irradiation curing of constituents (A), (B), (C), and optionally (G) in the absence of the (D) organic peroxide. The crosslinked polyolefin product may also contain by-products of curing such as alcohol products of the reaction of the (D) organic peroxide. When the polyolefin and polyvinylpyrrolidone formulation further contains one or more of any other optional additives (E), (F), and (H) to (K), the crosslinked polyolefin product may also contain the additive(s) or reaction by-products formed therefrom during the curing. The crosslinked polyolefin product may be in a divided solid form or in continuous form. The continuous form may be a molded part (e.g., blow molded part) or an extruded part (e.g., an insulation layer of an insulated electrical conductor).

The crosslinked polyolefin product (inventive product) may be s a networked polyolefinic resin containing crosslinking groups that are formed during curing of the polyolefin and polyvinylpyrrolidone formulation. The crosslinking groups may comprise C—C bonds or Si—O—Si bonds. The Si—O—Si bonds may be formed during curing of embodiments of the inventive formulation wherein constituent (A) contains hydrolyzable silane groups. A condensation catalyst, such as a Bronsted-Lowry acid, a Lewis acid, or an amine, may be used to enhance the rate of formation of the Si—O—Si bonds during curing.

The insulated electrical conductor: may be a coated metal wire or electrical cable, including power cable for use in low, medium, high and extra-high voltage electricity-transmitting applications. "Wire" means a single strand or filament of conductive material, e.g., conductive metal such as copper or aluminum, or a single strand or filament of optical fiber. "Power cable" means an insulated electrical conductor comprising at least one wire disposed within a covering that may be referred to as an insulation layer. Examples of suitable cable designs are shown in U.S. Pat. Nos. 5,246,783; 6,496,629; and 6,714,707.

The insulated electrical conductor may contain a conductive core and an outer single layer covering or an outer multilayer covering disposed therearound so as to protect and insulate the conductor core from external environments. The conductive core may be composed of one or more metal wires. When the conductive core is "stranded", it contains two or more metal wires, which may be sub-divided into discrete wire bundles. Each wire in the conductive core, whether bundled or not, may be individually coated with an insulation layer and/or the discrete bundles may be coated with an insulation layer. The single layer covering or multilayer covering (e.g., a single layer or multilayer coating or sheath) primarily functions to protect or insulate the conductive core from external environments such as sunlight, water, heat, oxygen, other conductive materials (e.g., to prevent short-circuiting), and/or other corrosive materials.

The single layer or multilayer covering from one insulated electrical conductor to the next may be configured differently depending upon their respective intended uses. For example, viewed in cross-section, the multilayer covering of the insulated electrical conductor may be configured sequentially from its innermost layer to its outermost layer with the following components: an inner semiconducting layer (in physical contact with the conductive core), an insulation layer comprising the crosslinked polyolefin product (inventive crosslinked product), an outer semiconducting layer, a metal shield, and a protective sheath. The layers and sheath are circumferentially and coaxially (longitudinally) continuous. The metal shield (ground) is coaxially continuous, and circumferentially either continuous (a layer) or discontinuous (tape or wire). The outer semiconducting layer, when present, may be composed of a peroxide-crosslinked semiconducting product that may be strippable from the insulation layer.

The method of conducting electricity: may use the inventive insulated electrical conductor or a different electrical conductor that includes the inventive formulation or product.

The inventive insulated electrical conductor is useful for data-transmitting applications and/or for electricity-transmitting applications, including low, medium, high, and ultra-high voltage applications. Ideally a power cable containing an insulation layer composed of the inventive formulation has a longer operating lifetime at higher voltages in outdoor environments.

Advantageously we discovered that the inventive formulation and/or product is characterized by decreased water-tree length (i.e., increased inhibition of water-tree growth) when tested according to Water-Tree Growth Test Method using ASTM D6097, described later, and/or enhanced (decreased) dissipation factor, both relative to a comparative composition that does not contain constituent (B). In aspects wherein the polyolefin and polyvinylpyrrolidone formulation comprises at least one optional additive, the amount(s) of such optional additive(s) is/are chosen in such a way so as to not negate or counteract the aforementioned advantage(s) or benefit(s).

A compound includes all its isotopes and natural abundance and isotopically-enriched forms. The enriched forms may have medical or anti-counterfeiting uses.

In some aspects any material (compound, composition, formulation, mixture, or reaction product) herein may be free of any one of the chemical elements selected from the group consisting of: H, Li, Be, B, C, N, O, F, Na, Mg, Al, Si, P, S, CI, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Tl, Pb, Bi, lanthanoids, and actinoids; with the proviso that chemical elements required by the material (e.g., C and H required by a polyolefin or C, H, and O required by an alcohol) are not excluded.

The following apply unless indicated otherwise. Alternatively precedes a distinct embodiment. AEIC means Association of Edison Illuminating Companies, Birmingham, Ala., USA. ASTM means the standards organization, ASTM International, West Conshohocken, Pa., USA. IEC means the standards organization, International Electrotechnical Commission, Geneva, Switzerland. ISO means the standards organization, International Organization for Standardization, Geneva, Switzerland. Any comparative example is used for illustration purposes only and shall not be prior art. Free of or lacks means a complete absence of; alternatively not detectable. ICEA means Insulated Cable Engineers Association and standards promulgated by IHS Markit, London, England. IUPAC is International Union of Pure and Applied Chemistry (IUPAC Secretariat, Research Triangle Park, N.C., USA). May confers a permitted choice, not an imperative. Operative means functionally capable or effective. Optional(ly) means is absent (or excluded), alternatively is present (or included). Unless said otherwise properties are measured using a standard test method and conditions for the measuring. Ranges include endpoints, subranges, and whole and/or fractional values subsumed therein; but a range of integers does not include fractional values. Room temperature: 23° C.±1° C. Substituted when referring to a compound means in place of a hydrogen atom.

Unless noted otherwise herein, use the following preparations for characterizations.

Polyolefin and polyvinylpyrrolidone formulation Preparation Method 1. Prepares embodiments of the polyolefin and polyvinylpyrrolidone formulation that are free of (D) organic peroxide. Feed constituent (A) into a Brabender internal mixer at 140° C. with rotor speed set at 10 rotations per minute (rpm) for up to 4 minutes. To the resulting melt feed constituents (B) and (C) to give a first inventive polyolefin and polyvinylpyrrolidone formulation consisting essentially of constituents (A), (B), and (C). To the first inventive polyolefin and polyvinylpyrrolidone formulation was added any non-peroxide optional additives (E) to (K), and mix at 140° C. and 45 rpm for 4 minutes to obtain a second inventive polyolefin and polyvinylpyrrolidone formulation as a uniform dispersion of (A), (B), (C), and any (E) to (K). Proceed to Pellets Preparation Method 1.

Pellets Preparation Method 1. Feed the second inventive polyolefin and polyvinylpyrrolidone formulation prepared by Polyolefin and polyvinylpyrrolidone formulation Preparation Method 1 into a hopper of a Brabender single screw extruder, and extrude a melt of the composition at 120° C. with a screw speed of 25 rpm to give the composition as a melt strand. Feed the melt strand into a Brabender Pelletizer to give the second inventive polyolefin and polyvinylpyrrolidone formulation in the form of pellets. Proceed to Soaking Method 1.

Soaking Method 1. Add 50 grams (g) of the pellets of the second inventive polyolefin and polyvinylpyrrolidone formulation prepared in the Pellets Preparation Method 1 and 0.865 g of (D) organic peroxide (e.g., (D1) dicumyl peroxide) into a 250 milliliter volume, fluorinated high density polyethylene (F-HDPE) bottle. Seal the bottle containing the pellets and (D) tightly. Allow the (D) organic peroxide to soak into the pellets at 70° C. for 8 hours, shaking the sealed bottle at 0, 2, 5, 10, 20, and 30 minutes, to give a third inventive polyolefin and polyvinylpyrrolidone formulation as soaked pellets comprising constituents (A) to (D) and any optional non-peroxide additives (E) to (K). Store the soaked pellets in the F-HDPE bottle at 23° C. until needed for testing.

Crosslinked Polyolefin Product and Compression Molded Plaque Preparation Method 1: Prepares compression molded plaques of crosslinked polyolefin product for dissipation factor testing. Sandwich 15 g of the soaked pellets prepared by Soaking Method 1 between two 2-millimeter (mm) thick poly(ethylene terephthalate) films to give a sandwich. Place the sandwich into a mold having the following dimensions: 180 mm×190 mm×0.5 mm. Place the mold containing the sandwich between upper and lower plates of a hot press machine and mold at 120° C. and 0 megapascals (MPa) applied pressure for 10 minutes to give a preheated mold. Hold the mold at 120° C. under 5 MPa for 0.5 minute, then at 120 C. under 10 MPa for 0.5 minute. Vent the mold 8 times, then hold the mold at 180° C. under 10 MPa pressure for approximately 13 minutes to give additional curing to give a crosslinked polyolefin product. Cool the mold from 180° to 25° C. under 10 MPa within 10 minutes, and remove the crosslinked polyolefin product, which is in the form of a compression-molded plaque. Test dissipation factor according to the below method.

Crosslinking Time (T90) Test Method (MDR: ML at 180° C. (N-m), MDR: MH-ML at 180° C. (N-m)): ASTM D5289-12, *Standard Test Method for Rubber Property—Vulcanization Using Rotorless Cure Meters*. Measure torque of a 6 grams cold pressed test sample using the following procedure. Heat test sample, obtained directly from a Brabender mixing bowl, in a moving die rheometer (MDR) instrument MDR2000 (Alpha Technologies) at 180° C. for 20 minutes at 0.5 degrees arc oscillation, while monitoring change in torque. Designate the lowest measured torque value as "ML", expressed in deciNewton-meter (dN-m). As curing or crosslinking progresses, the measured torque value increases, eventually reaching a maximum torque value. Designate the maximum or highest measured torque value as "MH", expressed in dN-m. All other things being equal, the greater the MH torque value, the greater the extent of crosslinking. Determine the T90 crosslinking time as being the number of minutes required to achieve a torque value equal to 90% of the difference MH minus ML (MH-ML), i.e., 90% of the way from ML to MH. The shorter the T90 crosslinking time, i.e., the sooner the torque value gets 90% of the way from ML to MH, the faster the curing rate of the test sample. Conversely, the longer the T90 crosslinking time, i.e., the more time the torque value takes to get 90% of the way from ML to MH, the slower the curing rate of the test sample. Measured in pound-inches (lb.-in.), and converted to Newton-meter (N-m), wherein 1.00 lb.-in.=0.113 N-m.

Density Test Method: measured according to ASTM D792-13, *Standard Test Methods for Density and Specific Gravity (Relative Density) of Plastics by Displacement,* Method B (for testing solid plastics in liquids other than water, e.g., in liquid 2-propanol). Report results in units of grams per cubic centimeter (g/cm$^3$).

Dielectric Constant and Dissipation Factor Test Methods. Conduct tests according to ASTM D150-11, *Standard Test Methods for AC Loss Characteristics and Permittivity (Dielectric Constant) of Solid Electrical Insulation,* at 50 Hz on a High Precision High Voltage Capacitance Bridge, QS87 from Shanghai Young Electrical Co. Ltd. with an electrode containing specimen holder in an oven, the high voltage power was YG8Q from Shanghai Young Electrical Co. Ltd. Test specimen is a cured (crosslinked) compression molded plaque prepared by Crosslinked Polyolefin Product and Compression Molded Plaque Preparation Method 1. Degas the plaque in a vacuum oven at 70° C. for 24 hours under atmospheric pressure. Trim test specimen, test thickness, and then sandwich between two electrodes in an oven at 110° C. immediately after the electrode temperature reached 100° C. Set potential at 2.5 kilovolts (kV), 5 kV, 7.5 kV, 10 kV, 7.5 kV, 5 kV, and 2.5 kV (all at 50 Hertz) across the film; calculate electrical stress on the film as equal to the applied voltage across the film divided by the thickness of the film in millimeters (mm); and test dissipation factor ("DF") and relative permittivity (i.e., dielectric constant, $\varepsilon_r$). Obtain a dissipation factor (DF) curve at different electrical stress values, typically plotted over a range from 5 kV/mm to 25 kV/mm. From the curve, calculate the DF value for electrical stress equal to 16 kV/mm.

Melt index (190° C., 2.16 kilograms (kg), "$I_2$") Test Method: for ethylene-based (co)polymer is measured according to ASTM D1238-04, *Standard Test Method for Melt Flow Rates of Thermoplastics by Extrusion Platometer,* using conditions of 190° C./2.16 kilograms (kg), formerly known as "Condition E" and also known as $I_2$. Report results in units of grams eluted per 10 minutes (g/10 min.). Propylene-based (co)polymer may be measured at 230° C.

Migration Test Method. The migration additives could be observed by putting 5 grams (g) pellets into an unused transparent, self-sealing polyethylene bag and pressing the pellets 5 times to see any marks become stamped on the bag. If marks are observed record "yes" and if there are no observed marks record "no".

Scorch Time Test Method (MDR: ts1 at either 180° C. or 140° C. (minutes)): Scorch time or time to scorch (ts1) of a sample "X" is measured by MDR at 140° C. and abbreviated ts1@140° C. Scorch time measured by MDR at 180° C. is abbreviated ts1@180° C. Scorch time is measured on an Alpha Technologies Rheometer MDR 2000E according to ISO 6502 as follows. Put 5 to 6 g of test material (pellets) into the MDR 200E instrument. Torque is measured as a function of time from 0 (start) to 120 minutes at 140° C. or from 0 (start) to 20 minutes at 180° C., respectively, and torque curve versus time is plotted. The ts1 is the length of time it takes from the start of the test (0 minute) to observe an increase of 1 deciNewton-meter (dNm) in torque from the minimum value in the torque curve. Use the ts1@140° C. to characterize scorch resistance during melt processing processes (e.g., melt compounding or extrusion). Use MDR at 180° C. to characterize curing potential (MH-ML) and curing speed (see Crosslinking Time (T90) Test Method above).

Water-Tree Growth Test Method: used method according to ASTM D6097-01a, *Standard Test Method for Relative Resistance to Vented Water-Tree Growth in Solid Dielectric Insulating Materials.* This test method covers the relative resistance to water-tree growth in solid translucent thermoplastic or crosslinked electrical insulating materials. It is especially applicable to extruded polymeric insulation materials useful in medium-voltage power cables. In summary, ten compression-molded disk specimens, each containing a controlled conical-shaped defect, are subjected to an applied voltage of 5 kilovolts (kV) at 1 kilohertz (kHz) and 23°±2° C. in an aqueous conductive solution of 0.01 Normal sodium chloride for 30 days. The controlled conical-shaped defect is created by a sharp needle with an included angle of 60° and a tip radius of 3 micrometers (μm). The electrical stress at the defect tip is thereby enhanced and is estimated by the Mason's Hyperbolic point-to-plane stress enhancement equation. This enhanced electrical stress initiates the formation of a vented water-tree grown from the defect tip. Each of the resulting treed specimens so produced is stained and sliced. The water-tree length and point-to-plane specimen thickness are measured under a microscope and used to calculate a ratio that is defined as the resistance to water-tree growth.

EXAMPLES

Constituent (A1): a low density polyethylene having a density of 0.92 gram per cubic centimeter (g/cm$^3$) and a melt index ($I_2$) (ASTM D1238-04, 190° C., 2.16 kg) of 2.0 grams per 10 minutes (g/10 min.). Available as product DXM-446 from The Dow Chemical Company, Midland, Mich., USA.

Constituent (B1): a polyvinylpyrrolidone homopolymer having a Mw of 10,000 g/mol. Product PVP-10K, a Polyvinylpyrrolidone, K 15, from TCI China.

Constituent (B2): a polyvinylpyrrolidone homopolymer, a powder, having a Mw of approximately 29,000 g/mol. Product PVP-29K, a polyvinylpyrrolidone powder from Sigma-Aldrich.

Constituent (B3): a polyvinylpyrrolidone homopolymer having a Mw of 40,000 g/mol. Product PVP-40K, a Polyvinylpyrrolidone, K 30, from TCI China.

Constituent (B4): a vinylpyrrolidone/vinyl acetate copolymer having a Mw of approximately 50,000 g/mol. Product PVP-g-Ac, a Poly(1-vinylpyrrolidone-co-vinyl acetate) from Sigma-Aldrich.

Constituent (B5): a polyvinylpyrrolidone-graft-(1-triacontene) copolymer having a Mw of approximately 50,000 g/mol and CAS number 136445-69-7. Product PVP-g-C30 from Sigma-Aldrich.

Antioxidant (C1): the compound distearyl thiodipropionate (dioctadecyl 3,3'-thiodipropionate). CAS Number [693-36-7]. Product Cyanox DSTDP from Cytec Solvay Group.

Antioxidant (C2): the compound 1,3,5-tris[[4-(1,1-dimethylethyl)-3-hydroxy-2,6-dimethylphenyl]methyl]-1,3,5-triazine-2,4,6-(1H,3H,5H)-trione. CAS Number 40601-76-1. Product Cyanox 1790 from Cytec Solvay Group.

Organic peroxide (D1): dicumyl peroxide. From Fangruida, People's Republic of China.

Stabilizer (E1): the compound N,N'-bisformyl-N,N'-(2,2,6,6-tetramethyl-4-piperidinyl)-hexamethylenediamine. CAS Number 124172-53-8. Product Uvinul 4050 H from BASF.

Another water-tree retardant (not (B)): Product PEG 20000 from Clariant.

Comparative Examples 1 to 2 (CE1 to CE2): for each comparative example, prepare a comparative polyolefin and polyvinylpyrrolidone formulation according to Polyolefin and polyvinylpyrrolidone formulation Preparation Method 1, Pellets Preparation Method 1, and Soaking Method 1, respectively, except omit constituent (B). For each comparative formulation prepared by Soaking Method 1, prepare comparative crosslinked polyolefin products of CE1 to CE2 according to Crosslinked Polyolefin Product and Compression Molded Plaque Preparation Method 1. Test according to the above methods. Composition. Composition and test results are reported below in Table 1.

TABLE 1

Compositions CE1 to CE2 and Test Results. ("0" means 0.00)

| Constituent (wt %) | CE1 | CE2 |
|---|---|---|
| (A1) | 97.93 | 97.33 |
| (B1) | 0 | 0 |
| (B2) | 0 | 0 |
| (B3) | 0 | 0 |
| (B4) | 0 | 0 |
| (B5) | 0 | 0 |
| (C1) | 0.23 | 0.23 |
| (C2) | 0.14 | 0.14 |
| (D1) | 1.70 | 1.70 |
| (E1) | 0.003 | 0.003 |
| PEG-20000 | 0 | 0.60 |
| Example Total | 100.00 | 100.00 |
| Average WTL (%) | 23.9 | 6.8 |
| DF @ 16 kV/mm, 100° C./50 Hz (%) | 0.02 | 0.35 |
| ML @ 180° C. (dNm) | 0.22 | 0.19 |
| MH @ 180° C. (dNm) | 3.29 | 3.51 |
| MH-ML @ 180° C. (dNm) | 3.07 | 3.32 |
| ts1 @ 180° C. (minutes) | 1.39 | 1.27 |
| T90 @ 180° C. (minutes) | 4.71 | 4.65 |
| ts1 @ 140° C. (minutes) | 48.08 | 46.78 |
| Migration | No | No |

As shown by the data in Table 1, CE1 to CE2, water tree length (WTL) describes the longitude of a water tree, the smaller value the better water tree retardant performance. DF is describing the electric energy dissipated by dielectric material, the smaller value the better. ML is the initial torque and MH is the final torque in heat curing, usually the larger MH the higher crosslinking density, and specific MH is needed in cable application. ts1 is the time used when torque increases 1 dNm, and T90 is the time used when torque reaches 90% of final torque. ts1 and T90 are describing the curing speed. The ts1 at (@) 140° C. characterizes scorch performance. The longer the ts1@140° C. time, the better the scorch retardant performance. Power cable industry require minimum times for ts1 at 140° C. Migration is describing the sweat out issue of additives, which should be prevented. CE1 is a non-water tree retardant example that shows poor water tree retardant performance, its water tree length (WTL) is 23.9%, and satisfactory DF 0.02%. CE2 uses an incumbent water tree retardant, and shows good water tree retardant performance, its water tree length (WTL) is 6.8%, and poor DF 0.35%.

Inventive Examples 1 to 6 (IE1 to IE6): for each inventive example, prepare a series of polyolefin and polyvinylpyrrolidone formulations according to Polyolefin and polyvinylpyrrolidone formulation Preparation Method 1, Pellets Preparation Method 1, and Soaking Method 1, respectively. For each polyolefin and polyvinylpyrrolidone formulation prepared by Soaking Method 1, prepare crosslinked polyolefin products of IE1 to IE6 according to Crosslinked Polyolefin Product and Compression Molded Plaque Preparation Method 1. Test according to the above methods. Composition and test results are reported below in Table 2.

TABLE 2

Compositions IE1 to CE6 and Test Results. ("0" means 0.00)

| Constituent (wt %) | IE1 | IE2 | IE3 | IE4 | IE5 | IE6 |
|---|---|---|---|---|---|---|
| (A1) | 96.93 | 97.33 | 97.33 | 97.33 | 96.98 | 96.02 |
| (B1) | 1.00 | 0.60 | 0 | 0 | 0 | 0 |
| (B2) | 0 | 0 | 0.60 | 0 | 0 | 0 |
| (B3) | 0 | 0 | 0 | 0.60 | 0 | 0 |
| (B4) | 0 | 0 | 0 | 0 | 0.95 | 0 |
| (B5) | 0 | 0 | 0 | 0 | 0 | 1.91 |
| (C1) | 0.23 | 0.23 | 0.23 | 0.23 | 0.23 | 0.23 |
| (C2) | 0.14 | 0.14 | 0.14 | 0.14 | 0.14 | 0.14 |
| (D1) | 1.70 | 1.70 | 1.70 | 1.70 | 1.70 | 1.70 |
| (E1) | 0.003 | 0.003 | 0.003 | 0.003 | 0.003 | 0.003 |
| PEG-20000 | 0 | 0 | 0 | 0 | 0 | 0 |
| Example Total | 100.00 | 100.00 | 100.00 | 100.00 | 100.00 | 100.00 |
| Average WTL (%) | 3.4 | 3.5 | 5.7 | 5.9 | 4.9 | 8.0 |
| DF @ 16 kV/mm, 100° C./50 Hz (%) | 0.1 | 0.06 | 0.07 | 0.09 | 0.13 | 0.08 |
| ML @ 180° C. (dNm) | 0.20 | 0.20 | 0.21 | 0.20 | 0.21 | 0.20 |
| MH @ 180° C. (dNm) | 3.52 | 3.73 | 3.98 | 3.80 | 3.89 | 3.36 |

TABLE 2-continued

Compositions IE1 to CE6 and Test Results. ("0" means 0.00)

| Constituent (wt %) | IE1 | IE2 | IE3 | IE4 | IE5 | IE6 |
|---|---|---|---|---|---|---|
| MH − ML@ 180° C. (dNm) | 3.32 | 3.53 | 3.77 | 3.60 | 3.68 | 3.16 |
| ts1 @ 180° C. (minutes) | 1.24 | 1.19 | 1.13 | 1.17 | 1.12 | 1.29 |
| T90 @ 180° C. (minutes) | 4.78 | 4.60 | 4.24 | 4.31 | 4.18 | 4.36 |
| ts1 @ 140° C. (minutes) | 38.88 | 41.00 | 39.38 | 41.58 | 37.95 | 43.59 |
| Migration | No | No | No | No | No | No |

As shown by the data in Table 2, the water tree length (WTL) of inventive IE1 to IE6 ranged from 3.4% to 8%, which showed significant water tree retardant compared with that of non-water tree retardant example CE1. Some incumbent, non-inventive formulations, as represented by CE2, in the medium voltage market use PEG 20000 as the only water tree retardant. CE2 has a WTL of 6.8% and an inferior DF (DF=0.35%) compared with IE1 to IE6 (DF<0.13%). All the inventive examples had no migration and showed good curing/scorch performance. The inventive formulation is useful as insulation layer of an electrical power cable.

The invention claimed is:

1. A polyolefin and polyvinylpyrrolidone formulation comprising from 79.99 to 99.94 weight percent (wt %) of (A) an olefin-based (co)polymer based on a total weight of the formulation; from 0.05 to 1.0 wt % of (B) a polyvinylpyrrolidone (co)polymer based on a total weight of the formulation; and from 0.01 to 1.5 wt % of (C) an antioxidant based on a total weight of the formulation; with the proviso that the formulation is free of an anti-static agent and a carbon black.

2. The polyolefin and polyvinylpyrrolidone formulation of claim 1 wherein the (A) olefin-based (co)polymer is (i) an ethylene-based (co)polymer, a propylene-based (co)polymer, or a combination of any two or more thereof; or (ii) a polyethylene homopolymer, an ethylene/alpha-olefin copolymer, an ethylene/unsaturated carboxylic ester copolymer, an ethylene/olefin-functional hydrolyzable silane copolymer, or a combination of any two or more thereof.

3. The polyolefin and polyvinylpyrrolidone formulation of claim 1 wherein the (B) polyvinylpyrrolidone (co)polymer is a polyvinylpyrrolidone homopolymer or a polyvinylpyrrolidone/olefin comonomer copolymer.

4. The polyolefin and polyvinylpyrrolidone formulation of claim 1 wherein the (C) antioxidant is a hindered phenol, a phosphite, a phosphonite, a thio compound, an antioxidizing amine, or a combination of any two or more thereof.

5. The polyolefin and polyvinylpyrrolidone formulation of claim 1 wherein the anti-static agent is an ethoxylated alkylamine, an ethoxylated dialkylamine, a fatty acid ester, a poly(ethylene glycol ester), a polyglycerol ester, a glycidyl ester, an alkyl sulfonate, a pentaerythritol ester, a sorbitan ester, or a diethanol amide of a carboxylic acid.

6. The polyolefin and polyvinylpyrrolidone formulation of claim 1, further comprising at least one additive chosen from optional additives (E) to (K): (E) a stabilizer (e.g., a compound that inhibits ultraviolet (UV) light-associated degradation); (F) a scorch retardant; (G) an alkenyl-functional coagent; (H) a nucleating agent; (I) a processing aid; (J) an extender oil; and (K) nanoparticles.

7. The polyolefin and polyvinylpyrrolidone formulation of claim 1, characterized by (i) an increase in water-tree length (WTL) of less than 10% when measured according to the Water-Tree Growth Test Method using ASTM D6097; (ii) a dissipation factor of less than 0.30%, when measured according to the Dissipation Factor Test Method; or both (i) and (ii).

8. The polyolefin and polyvinylpyrrolidone formulation of claim 1 comprising constituents (A) to (C), a (D) organic peroxide, and a (E) stabilizer, wherein the (A) olefin-based (co)polymer is a low density polyethylene containing comonomeric units derived from 1-butene, 1-hexene, or 1-octene; the (B) polyvinylpyrrolidone (co)polymer is a polyvinylpyrrolidone homopolymer having a weight-average molecular weight (Mw) from 10,000 to 40,000 grams per mole, a vinylpyrrolidone/vinyl acetate copolymer, or a polyvinylpyrrolidone-graft-(1-triacontene) copolymer; the (C) antioxidant is a hindered phenol, a thio compound, or a combination of a hindered phenol and a thio compound; and the (D) organic peroxide is dicumyl peroxide.

9. A method of making the polyolefin and polyvinylpyrrolidone formulation of claim 1, the method comprising mixing the (B) polyvinylpyrrolidone (co)polymer and (C) antioxidant into a melt of the (A) olefin-based (co)polymer to give a melt blend comprising constituents (A), (B), and (C); optionally extruding the melt blend to give an extrudate comprising constituents (A), (B), and (C); optionally pelletizing the extrudate to give pellets comprising constituents (A), (B), and (C); and optionally adding (D) organic peroxide to the melt blend, extrudate, or pellets to give the polyolefin and polyvinylpyrrolidone formulation.

10. A crosslinked polyolefin product that is a product of curing the polyolefin and polyvinylpyrrolidone formulation of claim 1.

11. An insulated electrical conductor comprising a conductive core and an insulation layer at least partially covering the conductive core, wherein at least a portion of the insulation layer comprises the crosslinked polyolefin product of claim 10.

12. A method of conducting electricity, the method comprising applying a voltage across the conductive core of the insulated electrical conductor of claim 11 so as to generate a flow of electricity through the conductive core.

13. A manufactured article comprising a shaped form of the crosslinked polyolefin product of claim 10.

* * * * *